United States Patent
Fife et al.

(10) Patent No.: US 7,511,943 B2
(45) Date of Patent: Mar. 31, 2009

(54) WET ELECTROLYTIC CAPACITOR CONTAINING A CATHODE COATING

(75) Inventors: James Allen Fife, Myrtle Beach, SC (US); Gang Ning, Myrtle Beach, SC (US); Zebbie Lynn Sebald, Myrtle Beach, SC (US); James Steven Bates, Saco, ME (US); Robert Hazen Pease, North Berwick, ME (US)

(73) Assignee: AVX Corporation, Myrtle Beach, SC (US)

( * ) Notice: Subject to any disclaimer, the term of this patent is extended or adjusted under 35 U.S.C. 154(b) by 115 days.

(21) Appl. No.: 11/372,486

(22) Filed: Mar. 9, 2006

(65) Prior Publication Data

US 2007/0211413 A1    Sep. 13, 2007

(51) Int. Cl.
*H01G 9/04* (2006.01)
(52) U.S. Cl. ............ 361/516; 361/517; 361/519; 361/523; 361/525; 361/528
(58) Field of Classification Search ........ 361/516–519, 361/523–525, 528–534, 508–512; 29/25.01, 29/25.03
See application file for complete search history.

(56) References Cited

U.S. PATENT DOCUMENTS

| | | | |
|---|---|---|---|
| 3,082,360 A | 3/1963 | Robinson et al. |
| 3,138,746 A | 6/1964 | Burger et al. |
| 3,647,415 A | 3/1972 | Yano et al. |
| 3,647,420 A | 3/1972 | Restelli |
| 3,835,055 A | 9/1974 | Chesnot |
| 3,958,044 A | 5/1976 | Yamaguchi et al. |
| 3,962,715 A | 6/1976 | Raccah et al. |
| 4,031,436 A | 6/1977 | Alwitt |
| 4,084,965 A | 4/1978 | Fry |
| 4,085,435 A | 4/1978 | Galvagni |
| 4,118,727 A | 10/1978 | Laplante |
| 4,121,949 A | 10/1978 | Walters |
| 4,149,876 A | 4/1979 | Rerat |
| 4,155,017 A | 5/1979 | Gaule et al. |
| 4,201,798 A | 5/1980 | Lindmayer |
| 4,408,257 A | 10/1983 | Walters |
| 4,412,902 A | 11/1983 | Michikami et al. |
| 4,466,841 A | 8/1984 | Walters |
| 4,469,610 A | 9/1984 | Fukuda et al. |
| 4,494,174 A | 1/1985 | Schroeder |

(Continued)

FOREIGN PATENT DOCUMENTS

CA    2018346    12/1990

(Continued)

OTHER PUBLICATIONS

Fife et al., U.S. Appl. No. 11/372,461, filed Mar. 9, 2006, Wet Electrolytic Capacitor.

(Continued)

*Primary Examiner*—Nguyen T Ha
(74) *Attorney, Agent, or Firm*—Dority & Manning, P.C.

(57) ABSTRACT

A wet electrolytic capacitor that includes an anode, cathode, and an electrolyte is provided. The cathode contains a substrate and a coating overlying the substrate. The coating comprises a sintered body containing carbonaceous particles (e.g., activated carbon) and inorganic particles (e.g., $NbO_2$).

40 Claims, 5 Drawing Sheets

U.S. PATENT DOCUMENTS

| | | | |
|---|---|---|---|
| 4,523,255 A | 6/1985 | Rogers | |
| 4,535,389 A | 8/1985 | Buczkowski et al. | |
| 4,599,383 A | 7/1986 | Satoji | |
| 4,672,267 A | 6/1987 | Lapatovich et al. | |
| 4,683,516 A | 7/1987 | Miller | |
| 4,684,399 A | 8/1987 | Bergman et al. | |
| 4,712,857 A | 12/1987 | Lee | |
| 4,722,756 A | 2/1988 | Hard | |
| 4,774,011 A | 9/1988 | Mori et al. | |
| 4,780,797 A | 10/1988 | Libby | |
| 4,892,862 A | 1/1990 | Ogushi et al. | |
| 4,945,452 A | 7/1990 | Sturmer et al. | |
| 4,981,942 A | 1/1991 | Bockrath et al. | |
| 4,985,098 A | 1/1991 | Kohno et al. | |
| 4,992,910 A | 2/1991 | Evans | |
| 5,011,999 A | 4/1991 | Bowman et al. | |
| 5,043,849 A | 8/1991 | Libby | |
| 5,098,485 A | 3/1992 | Evans | |
| 5,105,341 A | 4/1992 | Stephenson et al. | |
| 5,126,156 A | 6/1992 | Jones | |
| 5,160,653 A | 11/1992 | Clouse et al. | |
| 5,198,187 A | 3/1993 | Lu et al. | |
| 5,198,968 A | 3/1993 | Galvagni | |
| 5,232,169 A | 8/1993 | Kaneko et al. | |
| 5,304,330 A | 4/1994 | Tatarchuk et al. | |
| 5,306,479 A | 4/1994 | Sommers | |
| 5,357,399 A | 10/1994 | Salisbury | |
| 5,369,547 A | 11/1994 | Evans | |
| 5,394,295 A | 2/1995 | Galvagni et al. | |
| 5,400,211 A | 3/1995 | Evans | |
| 5,419,824 A | 5/1995 | Weres et al. | |
| 5,419,977 A | 5/1995 | Weiss et al. | |
| 5,442,978 A | 8/1995 | Hildreth et al. | |
| 5,448,447 A | 9/1995 | Chang | |
| 5,455,999 A | 10/1995 | Weiss et al. | |
| 5,457,862 A | 10/1995 | Sakata et al. | |
| 5,469,325 A | 11/1995 | Evans | |
| 5,473,503 A | 12/1995 | Sakata et al. | |
| 5,495,386 A | 2/1996 | Kulkarni | |
| 5,496,532 A | 3/1996 | Monzen et al. | |
| 5,522,558 A | 6/1996 | Kaneko | |
| 5,559,667 A | 9/1996 | Evans | |
| 5,687,057 A | 11/1997 | Dapo | |
| 5,726,118 A | 3/1998 | Ivey et al. | |
| 5,729,428 A | 3/1998 | Sakata et al. | |
| 5,737,181 A | 4/1998 | Evans | |
| 5,754,394 A | 5/1998 | Evans et al. | |
| 5,777,428 A | 7/1998 | Farahmandi et al. | |
| 5,786,555 A | 7/1998 | Saito et al. | |
| 5,786,980 A | 7/1998 | Evans | |
| 5,812,367 A | 9/1998 | Kudoh et al. | |
| 5,858,911 A | 1/1999 | Wellen et al. | |
| 5,894,403 A | 4/1999 | Shah et al. | |
| 5,926,362 A | 7/1999 | Muffoletto et al. | |
| 5,973,913 A | 10/1999 | McEwen et al. | |
| 5,982,609 A | 11/1999 | Evans | |
| 5,986,876 A | 11/1999 | Stepanov et al. | |
| 5,993,513 A | 11/1999 | Fife | |
| 6,051,044 A | 4/2000 | Fife | |
| 6,059,847 A | 5/2000 | Farahmandi et al. | |
| 6,072,692 A | 6/2000 | Hiratsuka et al. | |
| 6,094,339 A | 7/2000 | Evans | |
| 6,094,788 A | 8/2000 | Farahmandi et al. | |
| 6,104,600 A | 8/2000 | Suhara et al. | |
| 6,115,235 A | 9/2000 | Naito | |
| 6,126,097 A | 10/2000 | Chen et al. | |
| 6,128,179 A | 10/2000 | Morokuma | |
| 6,145,765 A | 11/2000 | Capelle, Jr. et al. | |
| 6,165,623 A | 12/2000 | Fife et al. | |
| 6,181,546 B1 | 1/2001 | Stepanov et al. | |
| 6,197,252 B1 | 3/2001 | Bishop et al. | |
| 6,208,502 B1 | 3/2001 | Hudis et al. | |
| 6,219,222 B1 | 4/2001 | Shah et al. | |
| 6,224,985 B1 | 5/2001 | Shah et al. | |
| 6,301,093 B1 | 10/2001 | Noguchi et al. | |
| 6,309,428 B1 | 10/2001 | Niiori et al. | |
| 6,310,765 B1 | 10/2001 | Tanahashi et al. | |
| 6,312,642 B1 | 11/2001 | Fife | |
| 6,322,912 B1 | 11/2001 | Fife | |
| 6,332,900 B1 | 12/2001 | Muffoletto et al. | |
| 6,334,879 B1 | 1/2002 | Muffoletto et al. | |
| 6,338,816 B1 | 1/2002 | Fife | |
| 6,373,685 B1 | 4/2002 | Kimmel et al. | |
| 6,375,704 B1 | 4/2002 | Habecker et al. | |
| 6,377,442 B1 | 4/2002 | Strange et al. | |
| 6,391,275 B1 | 5/2002 | Fife | |
| 6,402,066 B1 | 6/2002 | Habecker et al. | |
| 6,413,282 B1 | 7/2002 | Tanahashi et al. | |
| 6,414,837 B1 | 7/2002 | Sato et al. | |
| 6,416,730 B1 | 7/2002 | Fife | |
| 6,420,043 B1 | 7/2002 | Fife et al. | |
| 6,442,015 B1 | 8/2002 | Niiori et al. | |
| 6,455,108 B1 | 9/2002 | Muffoletto et al. | |
| 6,462,934 B2 | 10/2002 | Kimmel et al. | |
| 6,468,605 B2 | 10/2002 | Shah et al. | |
| 6,479,581 B1 | 11/2002 | Ireland et al. | |
| 6,507,480 B2 | 1/2003 | Nomoto et al. | |
| 6,510,042 B1 | 1/2003 | Lee et al. | |
| 6,517,645 B2 | 2/2003 | Fife | |
| 6,522,523 B2 | 2/2003 | Takatomi et al. | |
| 6,527,937 B2 | 3/2003 | Fife | |
| 6,562,255 B1 | 5/2003 | Feger | |
| 6,563,645 B2 | 5/2003 | Heemstra et al. | |
| 6,563,695 B1 | 5/2003 | Suzuki et al. | |
| 6,576,099 B2 | 6/2003 | Kimmel et al. | |
| 6,592,740 B2 | 7/2003 | Fife | |
| 6,594,139 B2 | 7/2003 | Muffoletto et al. | |
| 6,594,140 B1 | 7/2003 | Evans et al. | |
| 6,614,646 B2 | 9/2003 | Bogaki et al. | |
| 6,616,728 B2 | 9/2003 | Fife | |
| 6,639,787 B2 | 10/2003 | Kimmel et al. | |
| 6,674,635 B1 | 1/2004 | Fife et al. | |
| 6,687,116 B2 | 2/2004 | Hudis | |
| 6,687,117 B2 | 2/2004 | Liu et al. | |
| 6,702,869 B2 | 3/2004 | Habecker et al. | |
| 6,706,240 B2 | 3/2004 | Habecker et al. | |
| 6,721,169 B2 | 4/2004 | Melody et al. | |
| 6,721,170 B1 | 4/2004 | Evans et al. | |
| 6,743,370 B1 | 6/2004 | Feger et al. | |
| 6,759,026 B2 | 7/2004 | Kimmel et al. | |
| 6,761,728 B2 | 7/2004 | Harguth et al. | |
| 6,788,523 B1 | 9/2004 | Hossick-Schott et al. | |
| 6,801,424 B1 * | 10/2004 | Nielsen et al. | 361/517 |
| 6,827,879 B2 | 12/2004 | Shinozaki et al. | |
| 6,842,328 B2 | 1/2005 | Schott et al. | |
| 6,859,354 B2 | 2/2005 | Viste et al. | |
| 6,885,545 B2 | 4/2005 | Michel et al. | |
| 6,888,717 B2 | 5/2005 | Kinard et al. | |
| 6,914,768 B2 | 7/2005 | Matsumoto et al. | |
| 6,942,819 B2 | 9/2005 | Ebel et al. | |
| 6,952,339 B1 * | 10/2005 | Knowles | 361/528 |
| 6,965,510 B1 | 11/2005 | Liu et al. | |
| 7,085,126 B2 * | 8/2006 | Muffoletto et al. | 361/517 |
| 7,099,143 B1 | 8/2006 | Fife et al. | |
| 7,131,988 B2 | 11/2006 | Harguth et al. | |
| 7,157,073 B2 * | 1/2007 | Motchenbacher et al. | 423/594.17 |
| 7,160,615 B2 | 1/2007 | Iwaida et al. | |
| 7,169,284 B1 | 1/2007 | Jiang et al. | |
| 7,171,267 B2 | 1/2007 | Harguth et al. | |
| 7,203,055 B2 | 4/2007 | Shin et al. | |
| 7,271,994 B2 * | 9/2007 | Stemen et al. | 361/508 |
| 7,279,117 B2 | 10/2007 | Komatsu et al. | |
| 2002/0028175 A1 | 3/2002 | Fife | |

| | | | |
|---|---|---|---|
| 2002/0179753 | A1 | 12/2002 | Habecker et al. |
| 2003/0026756 | A1 | 2/2003 | Kimmel et al. |
| 2003/0172774 | A1 | 9/2003 | Naito et al. |
| 2004/0219094 | A1 | 11/2004 | Motchenbacher et al. |
| 2004/0225327 | A1 | 11/2004 | Norton et al. |
| 2004/0240149 | A1 | 12/2004 | Lessner et al. |
| 2004/0240152 | A1 | 12/2004 | Hossick-Schott et al. |
| 2004/0243183 | A1 | 12/2004 | Norton et al. |
| 2005/0034299 | A1 | 2/2005 | Kurihara et al. |
| 2005/0090108 | A1 | 4/2005 | Hossick-Schott et al. |
| 2005/0098242 | A1 | 5/2005 | Hossick-Schott et al. |
| 2005/0146841 | A1 | 7/2005 | Schott et al. |
| 2005/0150576 | A1 | 7/2005 | Venigalla |
| 2005/0177193 | A1 | 8/2005 | Nielsen et al. |
| 2005/0190530 | A1 | 9/2005 | Muffoletto et al. |
| 2006/0028787 | A1 | 2/2006 | Yoshida et al. |
| 2006/0091020 | A1 | 5/2006 | Hossick-Schott et al. |
| 2006/0139850 | A1 | 6/2006 | Rorvick et al. |
| 2006/0187616 | A1 | 8/2006 | Norton et al. |
| 2006/0198082 | A1 | 9/2006 | Eberhard et al. |
| 2006/0227496 | A1 | 10/2006 | Hossick-Schott et al. |

FOREIGN PATENT DOCUMENTS

| | | |
|---|---|---|
| CN | 1549286 | 11/2004 |
| EP | 1075884 | 2/2001 |
| EP | 1266386 | 12/2002 |
| EP | 1357086 | 10/2003 |
| GB | 1123015 | 8/1968 |
| JP | 62265119 | 11/1987 |
| JP | 2005222851 | 8/2005 |
| JP | 2005223155 | 8/2005 |
| WO | WO 9738143 | 10/1997 |
| WO | WO 9819811 | 5/1998 |
| WO | WO 9838660 | 9/1998 |
| WO | WO 9957739 | 11/1999 |
| WO | WO 0015555 | 3/2000 |
| WO | WO 0034299 | 6/2000 |
| WO | WO 0056486 | 9/2000 |
| WO | WO 0069588 | 11/2000 |
| WO | WO 01/26852 A1 | 4/2001 |
| WO | WO 0171738 | 9/2001 |
| WO | WO 02086923 | 10/2002 |
| WO | WO 2005028370 | 3/2005 |
| WO | WO 2005076297 | 8/2005 |
| WO | WO 2006127663 A3 | 11/2006 |

OTHER PUBLICATIONS

Gang Ning, U.S. Appl. No. 11/725,965, filed Mar. 20, 2007, Neutral Electrolyte for a Wet Electrolytic Capacitor.
Gang Ning, U.S. Appl. No. 11/725,966, filed Mar. 20, 2007, Cathode Coating for a Wet Electrolytic Capacitor.
Jones et al., U.S. Appl. No. 11/725,983, filed Mar. 20, 2007, Anode for use in Electrolytic Capacitors.
Jones et al., U.S. Appl. No. 11/726,029, filed Mar. 20, 2007, Wet Electrolytic Capacitor Containing a Plurality of Thin Powder-formed Anodes.
Brunauer, et al., Journal of American Chemical Society, "Adsorption of Gases in Multimolecular Layers", vol. 60, pp. 309-319, 1938.
Bauer, The Oxides of Niobium, Zeitschrift fuer anorganische und allegmeine Chemie, vol. 248, No. 1, 1941
Magneli, et al., "Note on the Crystal Structure of Niobium Dioxide", Acta Chem. Scand. 9, p. 1402, 1955.
Lapitskii, et al., Journal of Inorganic Chemistry, USSR, "The Formulation of Lower Oxides of Niobium and Tantalum in Some Reactions of Reduction and Oxidation", vol. II, No. 1, pp. 122-141, 1957.
Schwartz, et al., "Niobium Solid Electrolytic Capacitors," J. Electrochemical Society, 108(8):750-757, 1961.
Beacom, et al., "Mechanism of Addition Agent Reaction in Bright and Leveling Nickel Deposition", Journal of the Electrochemical Society, 1961.
Z. anorg. Allg. Chemie, vol. 317, pp. 321-333, 1962.

Mifune, et al., "Niobium Solid Electrolytic Capacitors," National Technical Report 9, 147, 1963.
Bowman, et al., "The Crystal Structure of Niobium Monoxide" Los Alamos Scientific Laboratory, University of California, 1966.
Baba, et al., J. Mining and Metallurgical Inst. Of Japan, vol. 82, No. 942, p. 855, 1966.
Feschotte, et al., "Niobium: Physico-Chemical Properties of its Compounds and Alloys" Atomic Energy Review, Special Issue No. 2, International Atomic Energy Agency pp. 57-59, Vienna, 1968.
Jackson, et al., "The Use of Niobium as an Anode Material in Liquid Filled Electrolytic Capacitors," Electrocomponent Science and Technology, vol. 1, pp. 27-37, 1974.
Vest et al., "Electrical Conductivity in Ceramics and Glass", Department of the Air Force, Aerospace Research Laboratories Wright-Patterson Air Force Base, Ohio, pp. 375-384, 1974.
Gannon, et al., "The Microstructure of Slightly Substoichiometric $NbO_2$", J. Solid Chemistry, 20, pp. 331-345, 1976.
J. Electrochemical Society: Review and News, 24(12):408C-409C, 1977.
Palatnik, et al., "Heat Field Stability and Crystallization Peculiarities of Amorphous $Nb_2O_5$, Films" Fizika I Khimiya Obrabotki Materialov, No. 5, pp. 87-94, 1980.
Bord, et al., "Quality of Niobium Oxide Semiconductor Capacitors as a Function of Chemical Composition of the Niobium Powder," No. 1(46):11-15, 1982.
Ivanovskiy, et al., "Method for the Production of Bulk Porous Anodes for Electrolytic Capacitors", 1983.
Krehl, et al., "The Influence of Gas Atmospheres on the First Stage Sintering of High-Purity Niobium Powders," Metallurgical Transactions A, vol. 15A, 1111-1116, 1984.
Orlov, et al., "Study of Oxygen Solubility in Niobium," Izvestiya Akademii Nauk SSSR, Metally,No. 5, pp. 202-205, 1985.
Petrucci, et al., "Growth of Thin-Film Niobium and Niobium Oxide Layers by Molecular Beam Epitaxy", J. Appl. Phys. 63 (3), pp. 900-909, 1987.
Sumin, "Study of NbO by Neutron Diffraction of Inelastic Scattering of Neutrons", Sov. Phys. Crystallogr., 34(3), 1989.
Japanese Abstract for Publication No. 01-176226, 1989.
Japanese Abstract for Publication No. 02-038501, 1990.
Japanese Abstract for Publication No. 03-023222, 1991.
Levinskiy, et al., "Change in Porous Structure and Leakage Currents of Niobium Capacitor Anodes During Electrolytic Oxidation," Poroshkovaya Metallurgiya, 3:56-59, 1991.
Japanese Abstract for Publication No. 04-070594, 1992.
Kuz'michevea, et al., "Superconductivity in the System Ln-Sr-Nb-O", vol. 38(1), pp. 162-166, 1992.
Eckert, "Niobium Compounds and Alloys," Int. J. Refractory Metals and Hard Materials, 12:335-340, 1993-94.
Yelyutin, et al., "Material For Anodes of Electrolytic and Oxide Stemiconductor Capacitors", 1994.
"Material Safety Data Sheet for NbO", ESPI Metals (1994), 1994.
Acrivos, et al., "Dynamic Phenomena in Superconducting Oxides Measured by ESR" Phys. Rev. B, vol. 50(18), pp. 13710-13723, 1994.
Acrivos, et al., "Dynamics of Flux Motion Observed by ESR in Superconducting Oxides" Physica C (Amsterdam) 235-240, pp. 3159-3160, 1994.
Al-Kharafi, et al., "Phosphoric Acid Passivated Niobium and Tantalum EIS-Comparative Study," Electrochimica Acta, vol. 40, No. 16, pp. 2623-2626, 1994-95.
Erarslanoglu, et al., "Oxidative Coupling of Methane Over NbO (p-type) and $Nb_2O_5$ (n-type) Semiconductor Materials", Catalysis Letters, 38, pp. 215-218, 1995-96.
Alfa Aesar Product Catalog, 1995-1996.
Encyclopedia of Chemical Technology, vol. 17, 4th Edition, pp. 59 and 65-66, 1996.
An, et al., "High-Capacitance Supercapacitor Using a Nanocomposite Electrode of Single-Walled Carbon Nanotube and Polypyrrole", Journal of the Electrochemical Society, 149 (8) pp. A1058-A1062, 2002.
Ramasamy, et al., "Electrochemical Characterization of a Polypyrrole/$CO_{0.2}CrOx$ Composite as a Cathode Material for Lithium Ion Batteries", Journal of Power Sources, 124, pp. 197-203, 2003.

Peabody, "Investigation of Columbium as an Electrolytic Capacitor Anode, Part II," U.S. Army Signal Research and Development Laboratory, DA Task NR. 3A99-15-003-04, pp. 1-11, Accession No. ADO603189, Monmouth, NJ, 1962.

Mellor, "Inorganic and Theoretical Chemistry" vol. IX, pp. 856-857, 1923.

Young article, "General Characteristics of the Film-Forming Metals: The Relation Between Overpotential and the Fields in the Oxide and Across the Interfaces", pp. 4-5 of Chapter 2.

Evans, et al., "Improved Capacitor Using Amorphous $RuO_2$", Evans Capacitor Company, 9th Int'l Seminar on Double Layer Capacitors and Similar Energy Storage Devices, Deerfield Beach, FL, 1999.

"Tantalum Nitride: A New Substrate for Solid Electrolytic Capacitors" by T. Tripp; Proceedings of CARTS 2000: 20th Capacitor and Resistor Technology Symposium, Mar. 6-20, 2000.

Abstract of Japanese Patent No. JP1158715 dated Jun. 21, 1989.

Abstract of Japanese Patent No. JP2023604 dated Jan. 25, 1990.

* cited by examiner

WET ELECTROLYTIC CAPACITOR CONTAINING A CATHODE COATING

BACKGROUND OF THE INVENTION

Electrolytic capacitors are increasingly being used in the design of circuits due to their volumetric efficiency, reliability, and process compatibility. Electrolytic capacitors typically have a larger capacitance per unit volume than certain other types of capacitors, making them valuable in relatively high-current and low-frequency electrical circuits. One type of capacitor that has been developed is a wet electrolytic capacitor that includes an anode, a cathode current collector (e.g., aluminum can), and a liquid or "wet" electrolyte. Wet electrolytic capacitors tend to offer a good combination of high capacitance with low leakage current and a low dissipation factor. In certain situations, wet electrolytic capacitors may exhibit advantages over solid electrolytic capacitors. For example, wet electrolytic capacitors may operate at a higher working voltage than solid electrolytic capacitors. Additionally, wet electrolytic capacitors are often larger in size than solid electrolytic capacitors, leading to larger capacitance values.

In an effort to further improve the electrical performance of wet electrolytic capacitors, carbon powder has sometimes been applied to the cathode current collector. Unfortunately, it is difficult to directly bond carbon powder to certain types of current collectors. Thus, a variety of techniques have been developed in an attempt to overcome this problem. For example, U.S. Pat. No. 6,914,768 to Matsumoto, et al. describes the application of a carbonaceous layer to a cathode current collector. The layer containing a carbonaceous material (e.g., activated carbon), a conductive agent (e.g., carbon black), and a binder material (e.g., polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins). Although the binder material may help adhere the carbonaceous material to the surface of the current collector, it is nevertheless believed to block the pores and surface of the carbonaceous material, thereby limiting its ability to increase the effective cathode surface area.

Thus, despite the benefits achieved with conventional wet electrolytic capacitors, a need currently for improvement nevertheless remains.

SUMMARY OF THE INVENTION

In accordance with one embodiment of the present invention, a wet electrolytic capacitor is disclosed that comprises an anode, a cathode, and an electrolyte disposed between the cathode and anode. The cathode contains a substrate (e.g., tantalum) and a coating overlying the substrate. The coating comprises carbonaceous particles (e.g., activated carbon) and inorganic particles (e.g., $NbO_2$). The inorganic particles are sinter bonded to the carbonaceous particles and to the substrate.

In accordance with another embodiment of the present invention, a method for forming a wet electrolytic capacitor is disclosed. The method comprises applying a coating formulation to a substrate of a cathode; sintering the coating formulation to form a cathode coating, the cathode coating comprising carbonaceous particles and inorganic particles; and disposing an electrolyte between the cathode and an anode.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
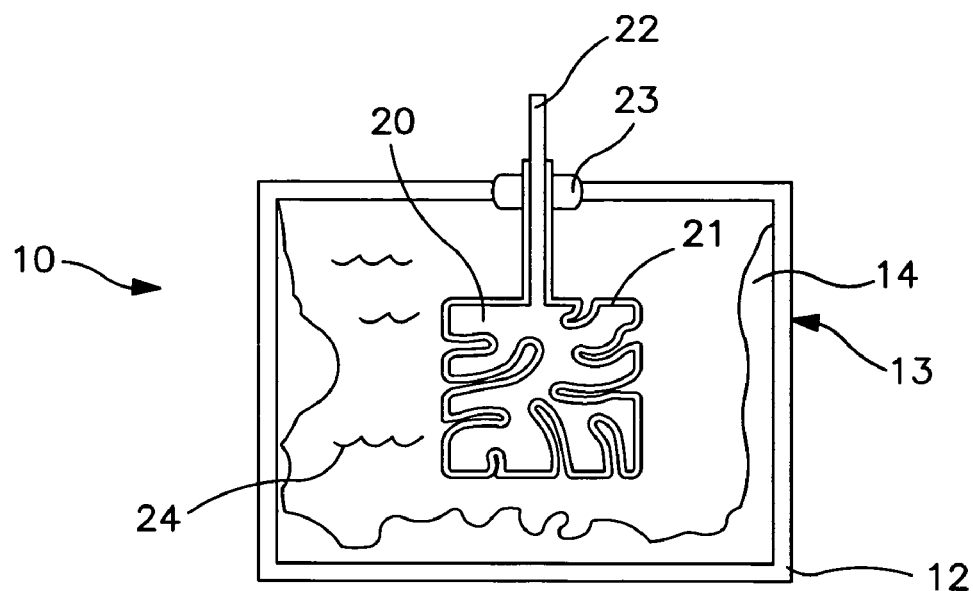
FIG. 1 is a cross-sectional view of one embodiment of a capacitor according to the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is directed to a wet electrolytic capacitor that includes an anode, cathode, and an electrolyte disposed therebetween. More specifically, the cathode is formed from a substrate that is coated with a sintered body containing carbonaceous particles and inorganic particles. The carbonaceous particles function to increase the effective surface area of the cathode substrate. Furthermore, when sintered, the inorganic particles form bonds with both the cathode substrate and carbonaceous particles, thereby adhering the carbonaceous particles to the substrate without significantly blocking their pores and/or surfaces. The present inventors have discovered that such a cathode coating has increased bond strength and may impart improved electrical properties to the resultant wet electrolytic capacitor. Various embodiments of the wet electrolytic capacitor will now be described in more detail. It should be understood that the description below is merely exemplary, and multiple other embodiments are also contemplated by the present invention.

I. Anode

The anode may generally be formed from a variety of different materials, For example, the anode may be formed from a powder constituted primarily by a valve metal (i.e., metal that is capable of oxidation) or from a composition that contains the valve metal as a component. Suitable valve metals that may be used include, but are not limited to, tantalum, niobium, aluminum, hafnium, titanium, alloys of these metals, and so forth. For example, the anode may be formed from a valve metal oxide or nitride (e.g., niobium oxide (e.g., NbO), tantalum oxide, tantalum nitride, niobium nitride, etc.) that is generally considered a semi-conductive or highly conductive material. Examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

A variety of conventional fabricating procedures may generally be utilized to form the anode. In one embodiment, a tantalum powder having a certain particle size is first selected. The particle size may vary depending on the desired voltage of the resulting capacitor. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Binders commonly employed for tantalum powder include camphor, stearic and other soapy fatty acids, Carbowax (Union Carbide), Glyptal (General Electric), polyvinyl alcohols, napthalene, vegetable wax, and microwaxes (purified paraffins). The binder may be dissolved and dispersed in a solvent. Exemplary solvents may include acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 4% by weight of the total mass. It should be understood, however, that binders and lubricants are not required in the present invention.

Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. Specifically, in one embodiment, the tantalum pellet is dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric thickness is formed over the surface of the tantalum pellet. The anodization voltage typically ranges from about 10 to about 200 volts, and in some embodiments, from about 20 to about 100 volts. In addition to being formed on the surface of the tantalum pellet, a portion of the dielectric oxide film will also typically form on the surfaces of the pores of the metal. It should be understood that the dielectric film may be formed from other types of materials and using different techniques.

II. Electrolyte

As indicated above, an electrolyte is disposed between and in contact with the anode and the cathode. The electrolyte is the electrically active material that provides the connecting path between the anode and cathode. The electrolyte is generally in the form of a liquid, such as a solution (e.g., aqueous or non-aqueous), dispersion, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

III. Cathode

In accordance with the present invention, the cathode contains a substrate and a coating that overlies the substrate. The substrate may be formed from any metal suitable for use in forming a capacitor. For instance, the cathode substrate may be formed from tantalum, niobium, aluminum, nickel, hafnium, titanium, copper, silver, alloys thereof, and so forth. The configuration of the cathode substrate may generally vary as is well known to those skilled in the art. For example, the substrate may be in the form of a container, can, foil, sheet, foam, screen, cloth, felt, etc. In one embodiment, the cathode substrate is a cylindrically-shaped "can" with an attached lid. The surface area of the cathode substrate is selected to provide a certain level of capacitance. For example, the cathode substrate covers a surface area of from about 1 to about 25 square centimeters, in some embodiments from about 2 to about 15 square centimeters, and in some embodiments, from about 5 to about 10 square centimeters. It should be understood that the specific surface area of the substrate may be much greater than the ranges specified above.

The cathode coating is formed from a sintered body containing carbonaceous particles, inorganic particles, and/or other components for providing improved properties to the resulting capacitor. The carbonaceous particles, for instance, increase the effective cathode surface area over which the electrolyte may electrochemically communicate with the cathode substrate. Such an increased effective cathode surface area allows for the formation of capacitors with increased cell capacitance for a given size and/or capacitors with a reduced size for a given capacitance. Typically, the carbonaceous particles have a specific surface area of at least about 200 $m^2/g$, in some embodiments at least about 500 $m^2/g$, and in some embodiments, at least about 1500 $m^2/g$. The term "specific surface area was determined by the physical gas adsorption (B.E.T.) method of Bruanauer, Emmet, and Teller, Journal of American Chemical Society, Vol. 60, 1938, p. 309, with nitrogen as the adsorption gas. To achieve the desired surface area, the carbonaceous particles generally have a small size. For example, the median size of the carbonaceous particles may be less than about 100 micrometers, in some embodiments from about 1 to about 50 micrometers, and in some embodiments, from about 5 to about 20 micrometers. Likewise, the carbonaceous particles may be porous. Without intending to be limited by theory, it is believed that porous carbonaceous particles provide a passage for the electrolyte to better contact the cathode substrate. For example, the carbonaceous particles may have pores/channels with a mean diameter of greater than about 5 angstroms, in some embodiments greater than about 20 angstroms, and in some embodiments, greater than about 50 angstroms.

In addition to possessing a high surface area, the carbonaceous particles are also conductive or semi-conductive so that the electrolyte maintains good electrical contact with the cathode substrate. The extent of conductivity may be characterized in terms of the "resistivity" of the carbonaceous particles at about 20° C., which is generally less than about 1 ohm-cm, in some embodiments less than about $1\times10^{-2}$ ohm-cm, and in some embodiments, less than about $1\times10^{-3}$ ohm-cm. Various carbonaceous particles may be employed in the present invention that have the desired level of conductivity, such as activated carbon, carbon black, graphite, etc. Some suitable forms of activated carbon and techniques for formation thereof are described in U.S. Pat. Nos. 5,726,118 to Ivey, et al.; 5,858,911 to Wellen, et al.; as well as U.S. Patent Application Publication No. 2003/0158342 to Shinozaki, et al., all of which are incorporated herein in their entirety by reference thereto for all purposes.

Generally speaking, it is difficult to bond the carbonaceous particles directly to the cathode substrate. To the extent that any bonding occurs, the bond would likely be a carbide bond (e.g., tantalum carbide) that is easily broken at high temperatures, thereby causing the removal of the carbonaceous particles. Thus, in accordance with the present invention, inorganic particles are also employed in the cathode coating to effectively segregate the carbonaceous particles from direct chemical contact with the cathode substrate. More specifically, the inorganic particles form bonds with the cathode substrate and carbonaceous particles when sintered (i.e., sinter bonded). The nature of the bond may vary, and may be metallurgical, covalent, electrostatic, etc. The inorganic particles may also surround the carbonaceous particles to further inhibit their removal. In this regard, the present inventors have discovered that inorganic particles that are smaller than the carbonaceous particles may more effectively surround such particles upon sintering. This relative size difference may be characterized by the ratio of the median particle size of the carbonaceous particles to the median particle size of the inorganic particles, which may range from about 1.5:1 to about 50:1, in some embodiments, from about 3:1 to about 25:1, and in some embodiments, from about 4:1 to about 15:1. To achieve the desired ratio, the median size of the inorganic particles may, for instance, be less than about 50 micrometers, in some embodiments less than about 20 micrometers, and in some embodiments, less than about 5 micrometers. Without intending to be limited by theory, the present inventors also believe that the inorganic particles do not substantially block the pores and surface of the carbonaceous particles. In this manner, the carbonaceous particles may retain a high surface area for contacting the electrolyte.

To ensure that the desired level of electrical contact is maintained, the inorganic particles are generally conductive or semi-conductive, but not necessarily to the same extent as the carbonaceous particles. For example, the inorganic particles typically have a resistivity (at about 20° C.) of less than about $1\times10^{5}$ ohm-cm, in some embodiments less than about $1\times10^{4}$ ohm-cm, and in some embodiments, less than about $1\times10^{3}$ ohm-cm. In this regard, any of a variety of conductive or semi-conductive particles that provide the desired level of adhesive strength may be used in the present invention. For example, the inorganic particles may be formed from a valve metal or from a composition that contains the valve metal as a component. Suitable valve metals that may be used include, but are not limited to, tantalum, niobium, aluminum, hafnium, titanium, as well as alloys, oxides, or nitrides of these metals. One particularly effective type of inorganic particle for use in the present invention is formed from niobium oxide having an atomic ratio of niobium to oxygen of 1:less than 2.5, in some embodiments 1:less than 1.5, in some embodiments 1:less than 1.1, and in some embodiments, 1:0.5±0.2. For example, the niobium oxide may be $NbO_{0.7}$, $NbO_{1.0}$, $NbO_{1.1}$, and $NbO_{2}$. In one particular embodiment, the inorganic particles are formed from $NbO_{2}$. $NbO_{2}$ is a relatively conductive niobium oxide that does not anodize under normal conditions. $NbO_{2}$ is also stable in or does not readily dissolve in $H_2SO_4$ or other electrolytes. Further, $NbO_{2}$ is chemically stable after sintering at high temperatures. That is, an $NbO_{2}$-coated cathode may be sintered at high enough temperatures such that the $NbO_{2}$ bonds well to the cathode substrate and carbonaceous particles, while still maintaining its chemical structure and physical properties. Additionally, it is believed that $NbO_{2}$-coated cathodes may effectively operate over a wide pH range, which allows for use of a wide range of different types of anodes.

The inorganic particles may have any shape desired, such as angular, nodular, flake, etc. The specific surface area of the inorganic particles may be from about 0.1 to about 200 m²/g, in some embodiments from about 0.5 to about 100 m²/g, and in some embodiments, from about 1 to about 40 m²/g. The inorganic particles may optionally be agglomerated using any technique known in the art, such as heat treatment, organic binders, and so forth. In one embodiment, for instance, the inorganic particles are agglomerated using one or more heat treatment steps in a vacuum or inert atmosphere at temperatures ranging from about 800° C. to about 1400° C. for a total time period of from about 30 to about 60 minutes.

The relative amount of the carbonaceous particles and inorganic particles in the cathode coating may also vary depending on the desired properties of the capacitor. For example, a greater relative amount of carbonaceous particles will generally result in a capacitor having a greater cathode capacitance. If the amount of the carbonaceous particles is too great, however, the cathode coating may insufficiently bond to the cathode substrate. Thus, to achieve an appropriate balance between these properties, the cathode coating of the present invention typically contains inorganic particles and carbonaceous particles in a weight ratio, respectively, of from about 0.2:1 to about 100:1, in some embodiments from about 0.5:1 to about 50:1, and in some embodiments, from about 1:1 to about 20:1. The inorganic particles may constitute from about 50 wt. % to about 99 wt. %, in some embodiments from about 60 wt. % to about 98 wt. %, and in some embodiments, from about 80 wt. % to about 95 wt. % of the cathode coating. Likewise, the carbonaceous particles may constitute from about 1 wt. % to about 50 wt. %, in some embodiments from about 2 wt. % to about 40 wt. %, and in some embodiments, from about 5 wt. % to about 20 wt. % of the cathode coating.

The cathode coating of the present invention may be single- or multi-layered. In single-layered coatings, for instance, the carbonaceous particles and inorganic particles are distributed in a manner so that the layer is substantially uniform or homogeneous across its thickness. In most embodiments, however, the cathode coating is formed from multiple layers. In this manner, the particular content, thickness, etc., of the layers may be selectively tailored to achieve the desired properties. For example, the cathode coating may contain a first layer overlying the cathode substrate and a second layer overlying the first layer. The second layer may contain carbonaceous particles, while the first layer may contain inorganic particles. For example, the first layer may be formed primarily from inorganic particles, such as in an amount greater than about 95 wt. %, and in some embodiments, 100 wt. %. As a result, the first layer may form a stronger bond with the cathode substrate than might otherwise form between the cathode substrate and a layer containing carbonaceous particles. Although the second layer may be formed primarily from carbonaceous particles (e.g., greater than about 95 wt. %), it is preferred that the second layer also employs inorganic particles in a sufficient amount to improve bond strength. For example, the second layer may contain inorganic particles in an amount from about 50 wt. % to about 90 wt. %, and in some embodiments, from about 60 wt. % to about 80 wt. %, and likewise contain carbonaceous particles in an amount from about 10 wt. % to about 50 wt. %, and in some embodiments, from about 20 wt. % to about 40 wt. %. If desired, the cathode coating may also contain a third layer overlying the second layer. The third layer may, for instance, be formed primarily from inorganic particles such as described above. In this manner, the first and third layer of inorganic particles will sandwich the second layer and further increase the likelihood that the carbonaceous particles will become fully encapsulated and bonded within an inorganic particle matrix.

To apply the coating to the cathode substrate, the carbonaceous particles and/or inorganic particles may be mixed with a solvent, either separately or together, to form a coating formulation that may be easily applied to a substrate. The coating formulation may include, for instance, a niobium oxide having an atomic ratio of niobium to oxygen of 1:less than 2.5. Alternatively, the coating formulation may also contain an oxide (e.g., $Nb_2O_5$) that is reduced to the desired level (e.g., $NbO_2$) upon sintering. Any solvent may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The concentration of the solvent may generally vary, it is nonetheless typically present in an amount from about 10 wt. % to about 80 wt. %, in some embodiments from about 20 wt. % to about 70 wt. %, and in some embodiments, from about 25 wt. % to about 60 wt. % of the coating formulation.

The solids content and/or viscosity of the coating formulation may generally vary as desired to achieve the desired coating thickness. For example, the solids content of the oxide may range from about 20% to about 80% by weight, more particularly, between about 30% to about 70% by weight, and even more particularly, between about 35% to about 65% by weight. By varying the solids content of the coating formulation, the presence of the particles in the coating may be controlled. For example, to form a cathode coating with a higher level of carbonaceous particles, the formulation may be provided with a relatively high solids content so that a greater percentage of the particles are incorporated into the coating during the application process. In addition, the viscosity of the coating formulation may also vary depending on the coating method and/or type of solvent employed. For instance, lower viscosities may be employed for some coating techniques (e.g., dip-coating), while higher viscosities may be employed for other coating techniques. Generally, the viscosity is less than about $2 \times 10^6$ centipoise, in some embodiments less than about $2 \times 10^5$ centipoise, in some embodiments less than about $2 \times 10^4$ centipoise, and in some embodiments, less than about $2 \times 10^3$ centipoise, such as measured with a Brookfield DV-1 viscometer with an LV spindle. If desired, thickeners or other viscosity modifiers may be employed in the coating formulation to increase or decrease viscosity.

Once formed, the coating formulation may then be applied to the cathode substrate using any known technique. For example, the cathode coating may be applied using techniques such as heat treating, thermal sintering, sputtering, screen-printing, dipping, electrophoretic coating, electron beam deposition, spraying, roller pressing, brushing, doctor blade casting, centrifugal casting, masking, and vacuum deposition. Other suitable techniques are also described in U.S. Pat. Nos. 5,369,547 to Evans, et al.; 6,594,140 to Evans, et al.; and 6,224,985 to Shah, et al., which are incorporated herein in their entirety by reference thereto for all purposes. For example, the cathode substrate may be dipped into or sprayed with the coating formulation. The coating formulation may cover an entire surface of the substrate. Alternatively, the coating formulation may cover only a portion of the substrate so that space remains for a lid, a stopper, or other component(s) to reside against the substrate. By way of example, the coating formulation may cover from about 25% and about 75% of a surface of the substrate, and in some embodiments, from about 40% to about 60% of a surface of the substrate. Upon application, the coating formulation may optionally be dried to remove any solvent(s). Drying may occur, for instance, at a temperature of from about 50° C. to about 150° C.

Regardless of the manner in which it is applied, the cathode coating of the present invention is sintered to form bonds between the inorganic particles and the carbonaceous particles and cathode substrate. Sintering may occur in one or more heating steps that are selectively controlled to provide the desired bonds without adversely affecting the physical properties of the inorganic particles and/or carbonaceous particles. For example, the heating step(s) generally occur at a temperature of from about 500° C. to about 2400° C., in some embodiments from about 700° C. to about 1500° C., and in some embodiments from about 900° C. to about 1200° C. Likewise, the heating step(s) generally occur at a relatively low pressure, such as less than about 200 millitorr, in some embodiments less than about 100 millitorr, and in some embodiments, less than about 50 millitorr. The total time of the heating step(s) may range from about 10 minutes to about 3 hours. Besides facilitating the adhesion of the coating to the cathode substrate, sintering may also provide other benefits. For example, sintering may cause a chemical change in the coating itself, such as by reducing $Nb_2O_5$ to $NbO_2$. In this manner, the desired oxide coating may be formed in situ.

If desired, the above-described application and sintering steps may be repeated until the desired thickness of the cathode coating is formed. In some embodiments, only a relatively thin layer of the coating is formed at a time. Without intending to be limited by theory, it is believed that the inorganic particles adhere better to the cathode substrate if the coating is applied through a series of thin layers. Thus, a thin layer of the coating may be added and sintered, and then another thin layer of the coating may be added and then sintered, wherein each thin layer has a thickness of less than about 150 µm, in some embodiments, less than about 100 µm, and in some embodiments, less than about 75 µm. The total target thickness of the cathode coating may generally vary depending on the desired properties of the capacitor. Typically, the cathode coating has a thickness of less than about 200 µm, and in some embodiments, from about 50 to about 150 µm.

Generally speaking, the sintered coating of the present invention is not readily corroded. Nevertheless, it may sometimes suffer certain structural defects when exposed to highly corrosive electrolytes (e.g., sulfuric acid) at high temperatures, which in turn leads to a weakening of the bond formed between the coating and the cathode substrate. To counteract this effect, a plurality of metal particles may optionally be employed in the present invention between the cathode substrate and coating. The metal particles can maintain a strong bond with both the cathode substrate and cathode coating under highly corrosive, high temperature conditions.

The metal particles may be constituted primarily by a metal or from a composition that contains a metal as a component. Suitable metal particles may, for instance, be formed from tantalum, niobium, aluminum, nickel, hafnium, titanium, copper, silver, etc., as well as alloys, oxides, and nitrides of these metals, such as described above. Preferably, the metal particles are formed from a material that is the same or substantially similar in nature to the cathode substrate. In this manner, a strong bond will form between the particles and the cathode substrate when sintered.

In one particular embodiment, for example, tantalum metal particles are employed for bonding to a tantalum substrate. Likewise, copper metal particles may be employed for bonding to a copper substrate.

Any of a variety of known techniques may be employed to form the metal particles. For example, metals may be extracted from their ores and formed into powders by processes that include chemical reduction. Valve metals (e.g., tantalum), for instance, may be prepared by reducing a valve metal salt with a reducing agent. The reducing agent may be hydrogen, active metals (e.g., sodium, potassium, magnesium, calcium, etc.), and so forth. Likewise, suitable valve metal salts may include potassium fluotantalate ($K_2TaF_7$), sodium fluotantalate ($Na_2TaF_7$), tantalum pentachloride ($TaCl_5$), etc. Examples of such reduction techniques are described in U.S. Pat. Nos. 3,647,415 to Yano, et al.; 4,149,876 to Rerat; 4,684,399 to Bergman, et al.; and 5,442,978 to Hildreth, et al., which are incorporated herein in their entirety by reference thereto for all purposes. For instance, a valve metal salt may be electrolytically reduced in a molten bath with a diluent alkali metal halide salt (e.g., KCl or NaCl). The addition of such diluents salts allows the use of lower bath temperatures. Valve metal powder may also be made by an exothermic reaction in a closed vessel in which the valve metal salt is arranged in alternate layers with the reducing agent. The enclosed charge is indirectly heated until the exothermic reaction is spontaneously initiated.

Mechanical milling techniques may be employed to grind the metal powder (e.g., metal hydride) to a desired size. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used are described in U.S. Pat. Nos. 5,522,558; 5,232,169; 6,126,097; and 6,145,765, which are incorporated herein in their entirety by reference thereto for all purposes.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth. Although not required, the metal powder may also be agglomerated using any technique known in the art. Typical agglomeration techniques involve, for instance, one or multiple heat treatment steps in a vacuum or inert atmosphere at temperatures ranging from about 800° C. to about 1400° C. for a total time period of from about 30 to about 60 minutes.

The metal particles may have any desired shape, such as nodular, flake, angular, fibrous, or an agglomerate thereof, and possess an irregular surface to which the cathode coating is better able to attach. Generally, the particles have a relatively large median size (individual or agglomerated), such as from about 20 to about 500 micrometers, in some embodiments from about 30 to about 400 micrometers, and in some embodiments, from about 50 to about 200 micrometers. The specific surface area of the metal particles may likewise range from about 0.05 to about 40 $m^2/g$, in some embodiments from about 0.1 to about 10 $m^2/g$, and in some embodiments, from about 0.5 to about 5 $m^2/g$.

Any of a variety of techniques may generally be employed to apply the metal particles to the substrate in accordance with the present invention, such as heat treating, thermal sintering, sputtering, screen-printing, dipping, electrophoretic coating, electron beam deposition, spraying, roller pressing, brushing, doctor blade casting, and vacuum deposition. Excess particles may be removed, for instance, by inverting the substrate. Upon application, the metal particles may optionally be heated to remove any binder/lubricant present in the particles. Heating may occur, for instance, at a temperature of from about 40° C. to about 800° C. If desired, the cathode substrate may optionally be pre-treated with a viscous liquid to hold the metal particles in place upon application to the substrate surface. For instance, the viscous liquid may be a solvent such as described above. Besides solvents, still other suitable viscous liquids may include water-soluble or water-swellable polymers, such as sodium, potassium and calcium alginates, carboxymethylcellulose, agar, gelatin, polyvinyl alcohol, collagen, pectin, chitin, chitosan, poly(α-amino acids), polyester, poly-1-caprolactone, polyvinylpyrrolidone, polyethylene oxide, polyvinyl alcohol, polyether, polysaccharide, hydrophilic polyurethane, polyhydroxyacrylate, polymethacrylate, dextran, xanthan, hydroxypropyl cellulose, methyl cellulose, and homopolymers and copolymers of N-vinylpyrrolidone, N-vinyllactam, N-vinyl butyrolactam, N-vinyl caprolactam, other vinyl compounds having polar pendant groups, acrylate and methacrylate having hydrophilic esterifying groups, hydroxyacrylate, acrylic acid, and combinations thereof. Further, resinous liquid adhesives (e.g., shellac) may also be employed.

Once applied, one or more layers (e.g., monolayer) of metal particles are typically formed on the substrate surface to form a coating. The thickness of the coating may vary depending on the size and configuration of the cathode substrate, anode, and optional cathode coating. Generally speaking, the metal particle coating has a total thickness of from about 20 to about 2000 micrometers, in some embodiments from about 30 to about 1000 micrometers, and in some embodiments, from about 50 to about 500 micrometers. By way of example, if tantalum particles having a particle size of about 100 μm are used, then one monolayer of tantalum particles has a thickness of about 100 μm. Then, forming about 10 monolayers containing these tantalum particles will provide a coating having a total thickness of about 1000 μm.

The extent to which the metal particles cover the cathode substrate may also vary. For example, the metal particles may be applied in a spaced-apart fashion over the surface of the cathode substrate so that they form "island-like" structures. In this manner, the constituents of the cathode coating may be subsequently disposed in the spaces of these adjacent particles to enhance their adherence to the cathode substrate. The extent to which the metal particles are spaced apart may vary, but may be approximately the same as the size of the metal particles. For example, adjacent metal particles may be spaced apart a distance that ranges from about 20 to about 500 micrometers, in some embodiments from about 30 to about 400 micrometers, in some embodiments, from about 50 to about 200 micrometers.

The metal particles are subsequently sintered so that a bond forms between the particles and the cathode substrate. Although such sintering step(s) may occur simultaneously with sintering of the cathode coating, it is usually desired that the metal particles are sintered separately, prior to the subsequent sintering of the cathode coating. In this manner, the sintering conditions may be more specifically tailored to the particles employed. For example, the metal particles may be sintered at a temperature that is higher than the preferred sintering temperature for the cathode coating, such as at a temperature of from about 1000° C. to about 2500° C., in some embodiments from about 1000° C. to about 2000° C., and in some embodiments from about 1200° C. to about 1800° C. The heating step(s) may occur at a relatively low pressure, such as less than about 200 millitorr, in some embodiments less than about 100 millitorr, and in some embodiments, less than about 50 millitorr. The total time of the heating step(s) may range from about 10 minutes to about 1 hour.

In addition to those identified above, other optional components may also be utilized in the wet electrolytic capacitor of the present invention. For example, a conductive polymer coating may be employed that overlies the cathode coating. Suitable conductive polymers may include, but are not limited to, polypyrroles; polythiophenes, such as poly(3,4-ethylenedioxythiophene) (PEDT); polyanilines; polyacetylenes; poly-p-phenylenes; and derivatives thereof. The conductive polymer coating may also be formed from multiple conductive polymer layers. For example, the conductive polymer coating may contain one layer formed from PEDT and another layer formed from a polypyrrole.

Although not required, the conductive polymer coating may further increase the effective capacitance of the capacitor. For example, when a conductive monomer polymerizes, it typically assumes an amorphous, non-crystalline form, which appears somewhat like a web when viewed under scanning electron microscopy. This means that the resultant conductive polymer coating has high surface area and therefore acts to somewhat increase the effective surface area of the coated substrate to which it is applied. Various methods may be utilized to apply the conductive polymer coating to the cathode coating. For instance, techniques such as sputtering, screen-printing, dipping, electrophoretic coating, electron beam deposition, spraying, and vacuum deposition, may be used to form the coating. In one embodiment, for example, the monomer(s) used to form the conductive polymer (e.g., PEDT), may initially be mixed with a polymerization catalyst to form a dispersion. For example, one suitable polymerization catalyst is BAYTRON C (Bayer Corp.), which is iron (III) toluene-sulphonate and n-butanol. BAYTRON C is a commercially available catalyst for BAYTRON M, which is 3,4-ethylenedioxythiophene, a PEDT monomer also sold by Bayer Corporation. Once a dispersion is formed, the coated cathode substrate may then be dipped into the dispersion so that conductive polymer forms. Alternatively, the catalyst and monomer(s) may also be applied separately. In one embodiment, the catalyst may be dissolved in a solvent (e.g., butanol) and then applied as a dipping solution. Although various methods have been described above, it should be understood that any other method for applying the coating comprising the conductive polymer coating may also be utilized in the present invention. For example, other methods for applying such a coating comprising one or more conductive polymers may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

A protective coating may also be optionally positioned between the conductive polymer coating and the cathode coating. It is believed that the protective coating may improve the mechanical stability of the interface between the conductive polymer coating and the cathode coating. The protective coating may be formed from a relatively insulative resinous materials (natural or synthetic). Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The physical arrangement of the cathode and its components may generally vary as is well known in the art. Referring to FIG. 1, for example, one embodiment of a wet electrolytic capacitor 10 is shown that includes an electrolyte 24 disposed between an anode 20 and a cathode 13. The anode 20 contains a dielectric film 21 and is embedded with a wire 22 (e.g., tantalum wire). The cathode 13 is formed from a cathode substrate 12 and a cathode coating 14. In this embodiment, the cathode substrate 12 is in the form of a cylindrically-shaped "can" with an attached lid. A seal 23 (e.g., glass-to-metal) may also be employed that connects and seals the anode 20 to the cathode 13. Although not shown, the capacitor 10 may also include a spacer (not shown) that holds the anode 20 steady within the cathode 13. The spacer may, for example, be made of plastic and may be washer-shaped.

Figure 2:
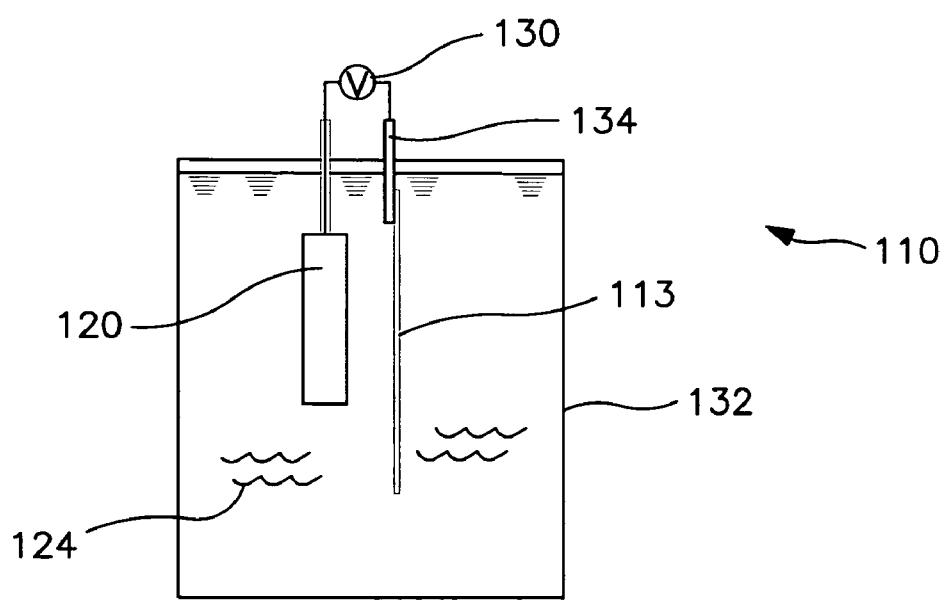
FIG. 2 is a perspective view of another embodiment of a capacitor according to the present invention.
Figure 3:
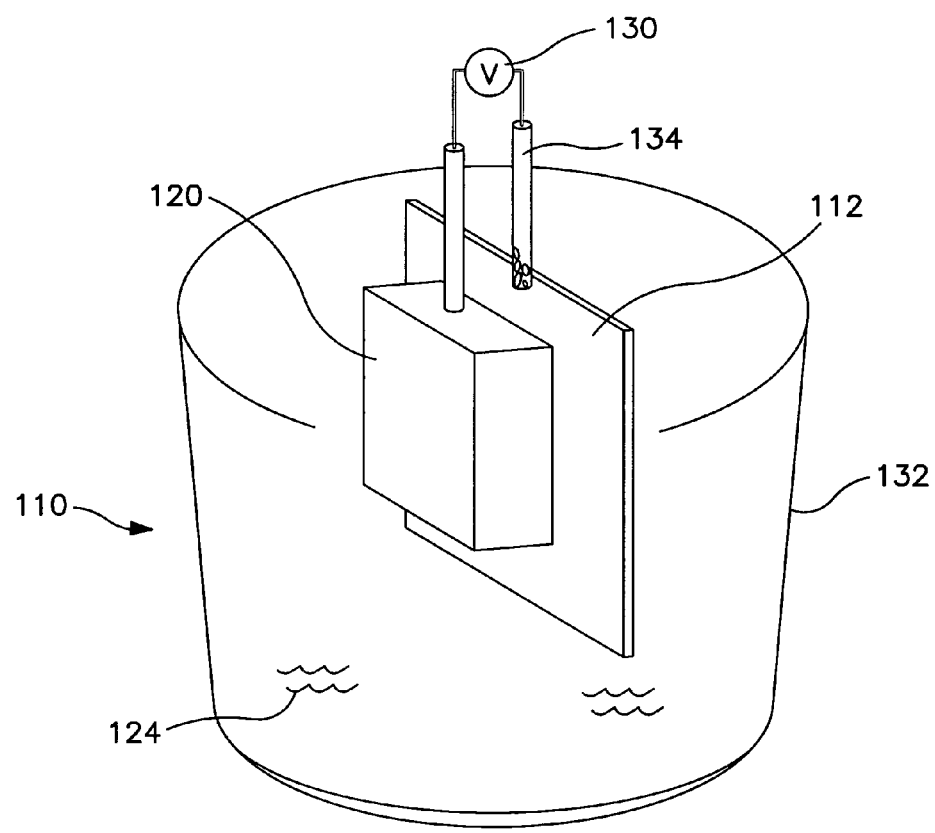
FIG. 3 is a side view of the capacitor of FIG. 2.

Another embodiment of the wet electrolytic capacitor of the present invention is shown in FIGS. 2 and 3. Similar to FIG. 1, a capacitor 100 is shown that includes an electrolyte 124 disposed between an anode 120 and a cathode 113. In this embodiment, however, the cathode 113 includes a cathode substrate (not shown) in the form of a rectangular-shaped metal foil or coupon. The cathode coating (not shown) extends over the sides of the rectangular-shaped metal coupon or foil. Further, the anode 120 and the cathode 113 are both attached to a voltage supply 130 and are suspended in a glass beaker 132 so that they do not touch one another. Although not shown, a separator (e.g., paper) may also be positioned between the cathode and anode as is well known in the art. Typically, the anode and cathode are separated by a distance of from about 10 micrometers to about 1000 micrometers. The cathode is attached to a metal wire 134 (e.g., tantalum wire) via spot welding for providing electrical continuity up to the voltage supply 30.

The wet electrolytic capacitor of the present invention exhibits excellent electrical properties. For example, the good electrical and mechanical interface formed between the cathode coating and substrate leads to a highly continuous connection with the electrolyte, thereby providing low equivalent series resistance (ESR). The equivalent series resistance of a capacitor generally refers to the extent that the capacitor acts like a resistor when charging and discharging in an electronic circuit and is usually expressed as a resistance in series with the capacitor. For example, a capacitor of the present invention may have an ESR of less than about 500 milliohms, in some embodiments less than about 300 milliohms, and in some embodiments, less than about 200 milliohms, measured with a 2-volt bias and 1-volt signal at a frequency of 120 Hz. It is also believed that the dissipation factor (DF) of the capacitor may also be maintained at relatively low levels. The dissipation factor (DF) generally refers to losses that occur in the capacitor and is usually expressed as a percentage of the ideal capacitor performance. For example, the dissipation factor of a capacitor of the present invention is typically less than about 10%, and in some embodiments, less than about 5%. Further, the capacitor may exhibit a higher level of cathode capacitance when compared to conventional wet electrolytic capacitors of the same general size and configuration. For example, the ratio of cathode capacitance to anode capacitance may be at least about 10, in some embodiments at least about 50, in some embodiments at least about 100, and in some embodiments, at least about 150. Additionally, it is believed that wet electrolytic capacitors are functional over a wider range of pH values (i.e., in more neutral pH environments) than certain conventional wet electrolytic capacitors. Functioning over a wider range of pH values means that wet electrolytic capacitors containing the cathodes described herein may contain a wider variety of anodes and other components, such as casing components.

The wet electrolytic capacitors of the present invention may be used in various applications, including but not limited to medical applications, such as defibrillators and so forth, as well as military applications, such as RADAR systems and so forth. The wet electrolytic capacitors of the present invention may also be used in consumer electronics including radios, televisions, and so forth.

The present invention may be better understood by reference to the following examples.

Test Methods

The capacitance, equivalence series resistance, and dissipation factor were measured at ambient temperature using an Agilent 4284A Precision LCR meter with Agilent 16089B Kelvin Leads with 2 volts bias and 1 volt signal. The operating frequency was 120 Hz. EG&G 273 Potentiostat and Solartron 1255 Frequency Response Analyzer were used for the electrical characterization. Communication between the hardware and the electrochemical cell was achieved through Screibner Corrware 2.1 software. The cell capacitance was measured directly and the largest measured cell capacitance was used as the real anode capacitance. Cathode capacitance was then calculated using the following equation:

$$C_{cathode} = \frac{1}{\frac{1}{C_{cell}} - \frac{1}{C_{anode}}}$$

wherein,
$C_{cell}$ is the measured cell capacitance;
$C_{anode}$ is the anode capacitance; and
$C_{cathode}$ is the cathode capacitance.

EXAMPLE 1

The ability to form a wet electrolytic capacitor in accordance with the present invention was demonstrated. A tantalum can (T4 case size) was used as the cathode substrate, which had a height of 2.65 centimeters, an outer diameter of 0.96 centimeters, and a wall thickness of 0.025 centimeters. The resulting surface area of the can was 7.0 square centimeters. The tantalum can was initially degreased in soap water for 10 minutes at a temperature of about 45° C.; cleansed with deionized water, air dried, and degreased again in ethanol; cleansed with deionized water, air dried, and etched with 10 vol. % hydrofluoric acid for less than 5 minutes; and cleansed with deionized water and air dried.

Two different inks (Inks A and B) were prepared for use in forming the cathode coating. Ink A was formed by mixing 2.2 grams of $NbO_2$ particles, 2.2 grams of activated carbon particles, and 12.0 milliliters of isopropanol. Ink B was formed by mixing 4.4 grams of $NbO_2$ particles and 12.0 milliliters of isopropanol. The $NbO_2$ particles were obtained from Reading Alloys, Inc. of Robesonia, Pa., and had a B.E.T. surface area of 3.46 $m^2/g$ and a median particle size of about 1 μm. The activated carbon particles were obtained from Norit Americas, Inc. under the designation "Norit DLC Super 30", and had a B.E.T. surface area of 1760 $m^2/g$ and a median particle size of 5 to 10 μm. The inks were then subjected to an ultrasonic bath for 30 minutes.

The first layer of the coating was formed by applying Ink B to the interior surface of the tantalum can using a pipette. The ink was then dried at 120° C. for 15 minutes. These steps were repeated 2 times so that the total weight of the first layer was 0.00160 grams. The second layer was then formed by applying Ink A to the tantalum can in the manner described above. The coating and drying steps were repeated 8 times so that the total weight of the second layer was 0.0214 grams. Finally, the third layer was formed using Ink B in the manner described above. These steps were repeated 3 times so that the total weight of the third layer was 0.0081 grams. The configuration of the resulting cathode coating is set forth below in Table 1.

TABLE 1

Cathode Coating Configuration

| Layer | Constituents | Weight (grams) |
|---|---|---|
| 1 | $NbO_2$ | 0.0016 |
| 2 | $NbO_2$ (50 wt. %) | 0.0107 |
|   | Activated carbon (50 wt. %) | 0.0107 |
| 3 | $NbO_2$ | 0.0081 |

The coated tantalum can was then sintered at 1150° C. at a pressure of 50 millitorr for 15 minutes.

To evaluate its electrical performance, the cathode was measured against a cylindrical tantalum slug and $H_2SO_4$ electrolyte. The tantalum anode was obtained from Tantalum Pellet Company of Phoenix Ariz. and was made of H.C. Starck NA30KT tantalum powder. The sintered cylindrical anode had a height of 1.8 centimeters and a diameter of 0.65 centimeters. The anode contained a built-in tantalum lead wire and weighed about 3.9 grams. The anode was then anodized at 50 volts in 85° C. phosphoric bath. The anodized tantalum anode had a capacitance of about 2.65 µF. The anodized tantalum anode was then mounted inside the coated tantalum can so that it was positioned 0.4 centimeters below the upper edge of the can. The $H_2SO_4$ electrolyte (5.0 molar) was slowly filled in to the upper edge of the can. The distance between the anode and cathode was approximately 1.0 millimeter. The resulting cell capacitance was 2.62 milliFarads ("mF"), the anode capacitance was 2.65 mF, and the cathode capacitance was 231.0 mF. Thus, the ratio of the cathode to anode capacitance was about 87.2. The cell ESR was 0.20 ohms.

EXAMPLE 2

The ability to form a wet electrolytic capacitor in accordance with the present invention was demonstrated. A tantalum can (T4 case size) was degreased and cleansed as Example 1. Two different inks (Inks A and B) were then prepared for use in forming the cathode coating. Ink A was formed by mixing 3.08 grams of $NbO_2$ particles, 1.32 grams of activated carbon particles, and 12.0 milliliters of isopropanol. Ink B was formed by mixing 4.4 grams of $NbO_2$ particles and 12.0 milliliters of isopropanol. The $NbO_2$ and activated carbon particles were the same as described in Example 1. The inks were then subjected to an ultrasonic bath for 30 minutes. The first layer of the coating was formed by applying Ink B to the interior surface of the tantalum can using a pipette. The ink was then dried at 120° C. for 15 minutes. These steps were repeated 2 times so that the total weight of the first layer was 0.00270 grams. The second layer was then formed by applying Ink A to the tantalum can in the manner described above. The coating and drying steps were repeated 8 times so that the total weight of the second layer was 0.0173 grams. Finally, the third layer was formed using Ink B in the manner described above. These steps were repeated 3 times so that the total weight of the third layer was 0.0043 grams. The configuration of the resulting cathode coating is set forth below in Table 2.

TABLE 2

Cathode Coating Configuration

| Layer | Constituents | Weight (grams) |
|---|---|---|
| 1 | $NbO_2$ | 0.00270 |
| 2 | $NbO_2$ (70 wt. %) | 0.01211 |
|   | Activated carbon (30 wt. %) | 0.00519 |
| 3 | $NbO_2$ | 0.00430 |

The coated tantalum can was then sintered at 1150° C. at a pressure of 50 millitorr for 15 minutes. Thereafter, the cathode was measured against a cylindrical tantalum slug and $H_2SO_4$ electrolyte as described in Example 1. The cell capacitance was 2.62 mF, the anode capacitance was 2.65 mF, and the cathode capacitance was 231.0 mF. Thus, the ratio of the cathode to anode capacitance was about 87.2. The cell ESR was 0.16 ohms.

EXAMPLE 3

The ability to form a wet electrolytic capacitor in accordance with the present invention was demonstrated. A tantalum can (T4 case size) was degreased and cleansed as Example 1. Two different inks (Inks A and B) were then prepared for use in forming the cathode coating. Ink A was formed by mixing 3.08 grams of $NbO_2$ particles, 1.32 grams of activated carbon particles, and 12.0 milliliters of isopropanol. Ink B was formed by mixing 4.4 grams of $NbO_2$ particles and 12.0 milliliters of isopropanol. The $NbO_2$ and activated carbon particles were the same as described in Example 1. The inks were then subjected to an ultrasonic bath for 30 minutes. The first layer of the coating was formed by applying Ink A to the interior surface of the tantalum can using a pipette. The ink was then dried at 120° C. for 15 minutes. These steps were repeated 8 times so that the total weight of the first layer was 0.0229 grams. The second layer was then formed by applying Ink B to the tantalum can in the manner described above. The coating and drying steps were repeated 3 times so that the total weight of the second layer was 0.0081 grams. The configuration of the resulting cathode coating is set forth below in Table 3.

TABLE 3

Cathode Coating Configuration

| Layer | Constituents | Weight (grams) |
|---|---|---|
| 1 | $NbO_2$ (70 wt. %) | 0.01603 |
|   | Activated carbon (30 wt. %) | 0.00687 |
| 2 | $NbO_2$ | 0.00810 |

The coated tantalum can was then sintered at 1150° C. at a pressure of 50 millitorr for 15 minutes. Thereafter, the cathode was measured against a cylindrical tantalum slug and $H_2SO_4$ electrolyte as described in Example 1. The cell capacitance was 2.64 mF, the anode capacitance was 2.65 mF, and the cathode capacitance was 699.0 mF. Thus, the ratio of the cathode to anode capacitance was about 264. The cell ESR was 0.19 ohms.

EXAMPLE 4

The ability to form a wet electrolytic capacitor in accordance with the present invention was demonstrated. A tantalum can (T4 case size) was degreased and cleansed as Example 1. One ink (Ink A) was then prepared for use in forming the cathode coating. Ink A was formed by mixing 4.4 grams of $NbO_2$ particles and 12.0 milliliters of isopropanol. The $NbO_2$ particles were the same as described in Example 1. The ink was then subjected to an ultrasonic bath for 30 minutes. The first layer of the coating was formed by applying Ink A to the interior surface of the tantalum can using a pipette. The ink was then dried at 120° C. for 15 minutes. These steps were repeated 8 times so that the total weight of the first layer was 0.068 grams. The second layer was then formed by applying Ink A to the tantalum can in the manner described above. The coating and drying steps were repeated 3 times so that the total weight of the second layer was 0.072 grams. Finally, the third layer was formed using Ink A in the manner described above. These steps were repeated 3 times so that the total weight of the third layer was 0.070 grams. The configuration of the resulting cathode coating is set forth below in Table 4.

TABLE 4

Cathode Coating Configuration

| Layer | Constituents | Weight (grams) |
|---|---|---|
| 1 | $NbO_2$ | 0.068 |
| 2 | $NbO_2$ | 0.072 |
| 3 | $NbO_2$ | 0.070 |

The coated tantalum can was then sintered at 1150° C. at a pressure of 50 millitorr for 15 minutes. Thereafter, the cathode was measured against a cylindrical tantalum slug and $H_2SO_4$ electrolyte as described in Example 1. The cell capacitance was 2.18 mF, the anode capacitance was 2.65 mF, and the cathode capacitance was 11.7 mF. Thus, the ratio of the cathode to anode capacitance was about 4.42. The the cell ESR was 0.17 ohms.

EXAMPLE 5

The ability to form a wet electrolytic capacitor in accordance with the present invention was demonstrated. A tantalum can (T4 case size) was degreased and cleansed as Example 1. Two different inks (Inks A and B) were then prepared for use in forming the cathode coating. Ink A was formed by mixing 3.52 grams of NbO particles, 0.88 grams of activated carbon particles, and 12.0 milliliters of isopropanol. Ink B was formed by mixing 4.4 grams of NbO particles and 12.0 milliliters of isopropanol. The NbO particles were obtained from Reading Alloys, Inc., and had a measured B.E.T. surface area of 1.22 $m^2/g$ and a median particle size of 1.8 micrometers. The activated carbon particles were the same as described in Example 1. The inks were then subjected to an ultrasonic bath for 30 minutes. The first layer of the coating was formed by applying Ink B to the interior surface of the tantalum can using a pipette. The ink was then dried at 120° C. for 15 minutes. These steps were repeated 2 times so that the total weight of the first layer was 0.0102 grams. The second layer was then formed by applying Ink A to the tantalum can in the manner described above. The coating and drying steps were repeated 8 times so that the total weight of the second layer was 0.0156 grams. Finally, the third layer was formed using Ink B in the manner described above. These steps were repeated 3 times so that the total weight of the third layer was 0.0120 grams. The configuration of the resulting cathode coating is set forth below in Table 5.

TABLE 5

Cathode Coating Configuration

| Layer | Constituents | Weight (grams) |
|---|---|---|
| 1 | NbO | 0.01020 |
| 2 | NbO (80 wt. %) | 0.01268 |
|   | Activated carbon (20 wt. %) | 0.00310 |
| 3 | NbO | 0.01200 |

The coated tantalum can was then sintered at 1150° C. at a pressure of 50 millitorr for 15 minutes. Thereafter, the cathode was measured against a cylindrical tantalum slug and $H_2SO_4$ electrolyte as described in Example 1. The cell capacitance was 2.58 mF, the anode capacitance was 2.65 mF, and the cathode capacitance was 97.7 mF. Thus, the ratio of the cathode to anode capacitance was about 36.8. The cell ESR was 0.16 ohms.

EXAMPLE 6

The ability to form a wet electrolytic capacitor in accordance with the present invention was demonstrated. A tantalum foil (thickness of 250 μm, surface area of 4.0 square centimeters) was degreased and cleansed as Example 1. The tantalum foil was then coated with agglomerated tantalum powder. Specifically, NH175 powder was obtained from H.C. Starck Co. and collected between #150 mesh and #250 mesh. A cotton swab soaked with 0.25 wt. % sodium carboxylmethyl cellulose water solution was used to wet the surface of the substrate. The collected tantalum powder was fed to the wet tantalum surface through a vibrated #250 mesh. The tantalum powder loaded foil was then sintered at a pressure of lower than 50 millitorr and at a temperature of 1900° C. for 10 minutes. Inks A and B were then applied as described in Example 1. The configurations of the resulting coatings are set forth below in Table 6.

TABLE 6

Metal Particle and Cathode Coating Configuration

| Layer | Constituents | Weight (grams) |
|---|---|---|
| 1 | Ta particles | 0.0602 |
| 2 | $NbO_2$ | 0.0103 |
| 3 | $NbO_2$ (80 wt. %) | 0.0136 |
|   | Activated carbon (20 wt. %) | 0.0034 |
| 4 | $NbO_2$ | 0.0125 |

The coated tantalum foil was then sintered at 1150° C. at a pressure of 50 millitorr for 15 minutes.

To evaluate its electrical performance, the cathode was measured against a cylindrical tantalum slug and $H_2SO_4$ electrolyte. The tantalum anode was obtained from Tantalum Pellet Company of Phoenix Ariz. and was made of H.C. Starck NA30KT tantalum powder. The sintered cylindrical anode had a height of 1.8 centimeters and a diameter of 0.65 centimeters. The anode contained a built-in lead tantalum lead wire and weighed about 3.9 grams. The anode was then anodized at 50 volts in 85° C. phosphoric bath. The anodized tantalum anode had a capacitance of about 2.65 mF. The anode and cathode were then placed in a 100-milliliter beaker filled with 5.0 M $H_2SO_4$ so that the distance between the anode and cathode was approximately 1.0 millimeter. The cell capacitance was 2.58 mF, the anode capacitance was 2.65 mF, and the cathode capacitance was 97.7 mF. Thus, the ratio of the cathode to anode capacitance was about 36.9. The dissipation factor was 0.86.

Figure 4:
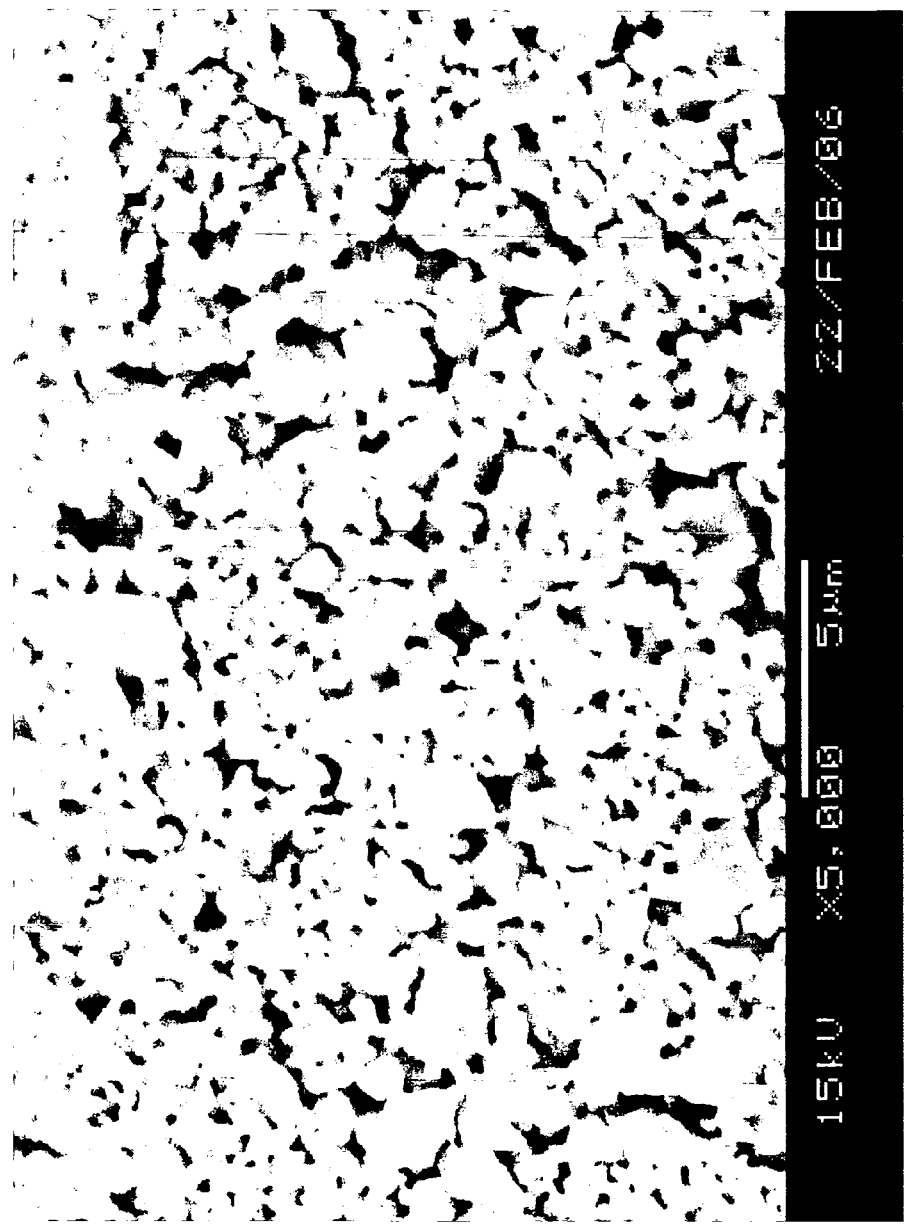
FIG. 4 is SEM microphotograph (5000×) of the top of the cathode coating formed in Example 6.
Figure 5:
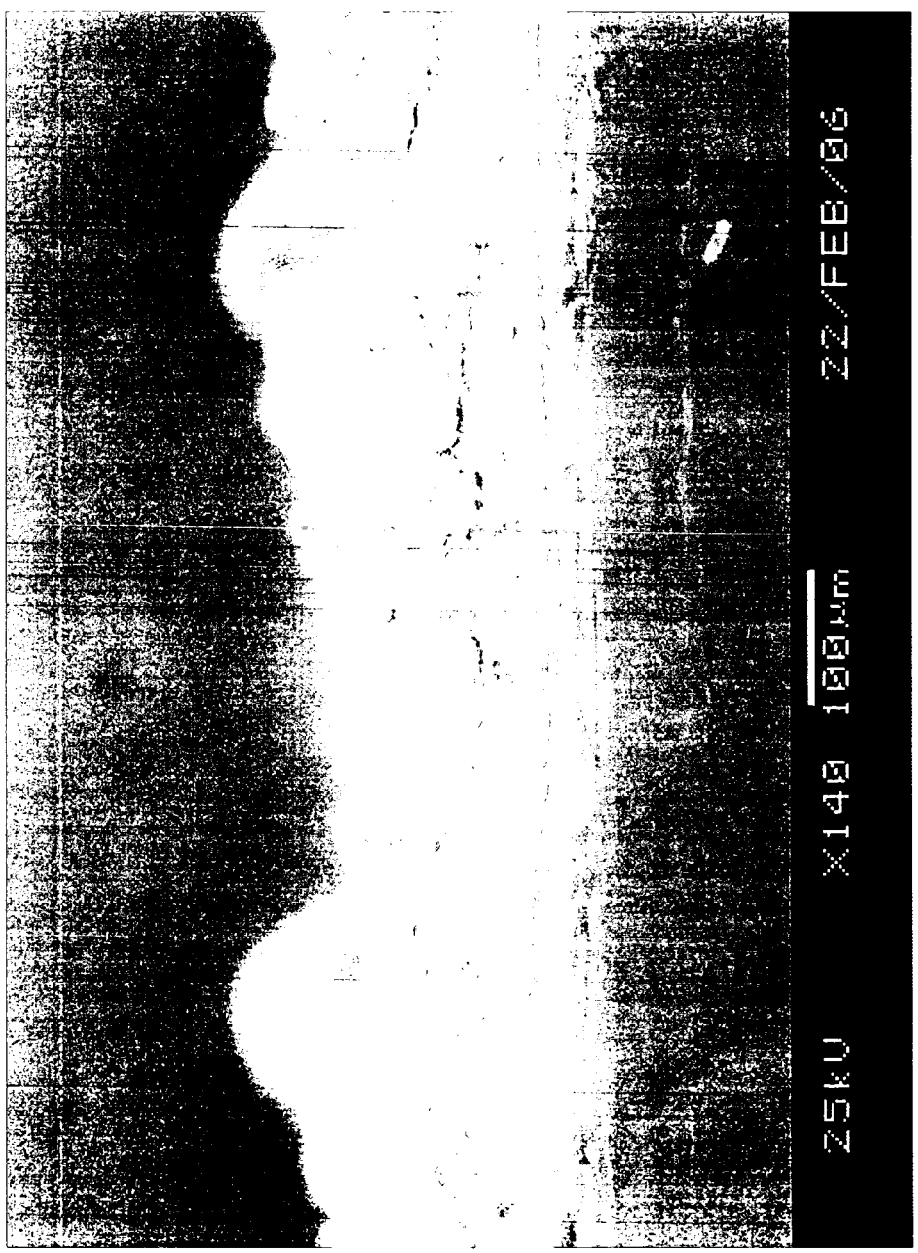
FIG. 5 is SEM microphotograph (140×) of the side of the cathode coating formed in Example 6.
Figure 6:
FIG. 6 is SEM microphotograph (2500×) of a cross-section of the cathode coating formed in Example 6.

Various scanning electron microphotographs ("SEMs") were also taken of the capacitor as shown in FIGS. 4-6. The top view of FIG. 4, for instance, illustrates the presence of primarily niobium dioxide particles, which evidences that the migration of the activated carbon particles from the coating was inhibited. Likewise, the "island-like" appearance of the coating illustrated in FIG. 5 evidences the presence of the tantalum agglomerates. It is believed that these agglomerates further improve the adherence of the cathode coating to the substrate. Finally, the cross-sectional view of FIG. 6 shows the presence of both niobium dioxide particles (white color) and activated carbon particles (dark color) within the cathode coating.

EXAMPLE 7

The ability to form a wet electrolytic capacitor in accordance with the present invention was demonstrated. Tantalum cans (T4 case size) were degreased and rinsed as in Example 1. The tantalum cans were then coated with agglomerated tantalum powder. Specifically, NH175 powder was obtained from H.C. Starck Co. and collected between #150 mesh and #250 mesh. A cotton swab soaked with di(ethylene glycol) ethyl ether acetate was used to wet the surface of the substrate. The collected tantalum powder was fed to the wet tantalum surface through a vibrated #250 mesh (i.e., 75 to 150 micrometers). While the cans were tilted at an angle of 70°, the tantalum powder was sprinkled into the cans. The cans were then rotated approximately 45° and additional tantalum powder was sprinkled therein. This was repeated until the cans were each rotated 360° and had a loading of approximately 0.125 grams. The tantalum powder loaded cans were then sintered at a pressure of less than 50 millitorr and at a temperature of 1825° C. for 30 minutes.

An ink was then prepared from NH175 tantalum powder (H.C. Starck) having an average size of less than 25 μm, which was obtained by screening. 2 grams of the tantalum powder was then mixed with 1 gram of activated carbon (average size of 10 μm) in 10 milliliters of di(ethylene glycol) ethyl ether acetate. The activated carbon particles were the same as described in Example 1. The stirred ink was pipetted into the can and pipetted out, leaving a coating of ink on the inner surface of the cans. The cans were dried at 125° C. in air for 15 minutes. These steps were repeated 2 times. The configurations of the resulting coatings are set forth below in Table 7.

TABLE 7

Metal Particle and Cathode Coating Configuration

| Can | Substrate Weight (g) | Wt. of Tantalum Particles (g) | Wt. of Cathode Coating (g) |
|---|---|---|---|
| 1 | 3.6736 | 0.2254 | 0.0213 |
| 2 | 3.6696 | 0.1935 | 0.0208 |

TABLE 7-continued

Metal Particle and Cathode Coating Configuration

| Can | Substrate Weight (g) | Wt. of Tantalum Particles (g) | Wt. of Cathode Coating (g) |
|---|---|---|---|
| 3 | 3.6729 | 0.1810 | 0.0199 |
| 4 | 3.6734 | 0.1982 | 0.0270 |
| 5 | 3.6429 | 0.1807 | 0.0213 |

The coated tantalum cans were then sintered at 1550° C. at a pressure of less than 50 millitorr for 10 minutes. Thereafter, the cathodes were measured against a cylindrical tantalum slug and $H_2SO_4$ electrolyte as described in Example 1. The results are shown below in Table 8.

TABLE 8

Electrical Properties

| | With Anode | |
|---|---|---|
| Sample | Capacitance (μF) | ESR (ohms) |
| 1 | 2302 | 0.329 |
| 2 | 2349 | 0.272 |
| 3 | 2287 | 0.273 |
| 4 | 2149 | 0.253 |
| 5 | 2354 | 0.345 |

EXAMPLE 8

An aluminum foil was compared to a tantalum foil for its ability to adhere to the cathode coating of the present invention. The aluminum foil (thickness of 25 μm, surface area of 7.0 square centimeters) was initially degreased and cleansed as Example 1. Ink B was prepared as described in Example 1 and applied to the aluminum foil to achieve a total coating weight of 0.051 grams. The coated aluminum foil was then sintered at 600° C. at a pressure of less than 50 millitorr for 15 minutes. For comparison, a tantalum foil (thickness of 25 μm, surface area of 7.0 square centimeters) was also degreased and cleansed as Example 1, and then applied with Ink B to achieve a total coating weight of 0.051 grams. The coated tantalum foil was then sintered at 1150° C. at a pressure of less than 50 millitorr for 15 minutes. Scraping with a laboratory spatula was used to evaluate the adhesion. The $NbO_2$ coating appeared to adhere better to the tantalum foil than the aluminum foil.

EXAMPLE 9

A copper foil was compared to a tantalum foil for its ability to adhere to the cathode coating of the present invention. The copper foil (thickness of 25 μm, surface area of 7.0 square centimeters) was initially degreased and cleansed as Example 1. Ink B was prepared as described in Example 1 and applied to the foil to achieve a total coating weight of 0.050 grams. The coated foil was then sintered at 900° C. at a pressure of less than 50 millitorr for 15 minutes. For comparison, a tantalum foil (thickness of 25 μm, surface area of 7.0 square centimeters) was also degreased and cleansed as Example 1, and then applied with Ink B to achieve a total coating weight of 0.050 grams. The coated tantalum foil was then sintered at 1150° C. at a pressure of less than 50 millitorr for 15 minutes. Scraping with a laboratory spatula was used to evaluate the adhesion. The NbO₂ coating appeared to adhere comparably to the tantalum foil and copper foil.

EXAMPLE 10

A stainless steel substrate was compared to a tantalum foil for its ability to adhere to the cathode coating of the present invention. The stainless steel substrate (thickness of 500 μm, surface area of 7.0 square centimeters) was initially degreased and cleansed as Example 1. Ink B was prepared as described in Example 1 and applied to the substrate to achieve a total coating weight of 0.056 grams. The coated substrate was then sintered at 1000° C. at a pressure of less than 50 millitorr for 15 minutes. For comparison, a tantalum foil (thickness of 25 μm, surface area of 7.0 square centimeters) was also degreased and cleansed as Example 1, and then applied with Ink B to achieve a total coating weight of 0.056 grams. The coated tantalum foil was then sintered at 1150° C. at a pressure of less than 50 millitorr for 15 minutes. Scraping with a laboratory spatula was used to evaluate the adhesion. The NbO₂ coating appeared to adhere better to the tantalum foil than the stainless steel substrate.

EXAMPLE 11

A nickel foam was compared to a tantalum foil for its ability to adhere to the cathode coating of the present invention. The nickel foam (thickness of 200 μm, surface area of 7.0 square centimeters, obtained from Inco, Canada) was initially degreased and cleansed as Example 1. Ink B was prepared as described in Example 1 and applied to the foam to achieve a total coating weight of 0.048 grams. The coated foam was then sintered at 1150° C. at a pressure of less than 50 millitorr for 15 minutes. For comparison, a tantalum foil (thickness of 25 μm, surface area of 7.0 square centimeters) was also degreased and cleansed as Example 1, and then applied with Ink B to achieve a total coating weight of 0.048 grams. The coated tantalum foil was then sintered at 1150° C. at a pressure of less than 50 millitorr for 15 minutes. Scraping with a laboratory spatula was used to evaluate the adhesion. The NbO₂ coating appeared to adhere comparably to the tantalum foil and nickel foam.

EXAMPLE 12

A nickel foam (thickness of 1.6 mm, surface area of 2.0 square centimeters, obtained from Inco, Canada) was provided. The thickness of the foam was decreased to 200 μm by cold rolling. Inks A and B were then prepared as set forth below in Table 9.

TABLE 9

| | Ink Configuration | |
|---|---|---|
| | Ink A | Ink B |
| NbO₂ (g) | 3.52 | 4.4 |
| Activated carbon (g) | 0.88 | 0.0 |
| Isopropyl alcohol (ml) | 12.0 | 12.0 |

Ink B was applied to the nickel foam by dip coating and dried at 120° C. for 15 minutes. The coating and the drying steps were repeated 2 times so that the total loading of the first layer was 0.0765 grams. The nickel foam was then dip coated into Ink A and dried at 120° C. for 15 minutes. The coating and drying steps were repeated 3 times so that the total loading of the second layer was 0.0125 grams. Finally, the third layer was formed using Ink B in the manner described above. These steps were repeated 3 times so that the total loading of the third layer was 0.0049 grams. The coated nickel foam was then sintered at 1200° C. at a pressure of 50 millitorrs for 15 minutes. Thereafter, the cathode was measured in a three-electrode system to determine the cathode capacitance using the Cyclic Voltammetry method. The counter electrode was a platinum mesh of 5.0 cm², the reference electrode was a saturated calomel electrode (SCE), and the cathode potential was scanned between—0.5 V vs. SCE and 0.5 V vs. SCE at a rate of 25 mV/s. The measured cathode capacitance was 204 mF. The specific capacitance of the activated carbon was about 81.6 F/g, and was calculated by dividing the measured cathode capacitance by the weight of activated carbon present in the cathode.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode;
   a cathode containing a substrate and a coating overlying the substrate, the coating comprising carbonaceous particles and inorganic particles, wherein the inorganic particles contain a niobium oxide having an atomic ratio of niobium to oxygen of 1:less than 2.5 and are sinter bonded to the carbonaceous particles and to the substrate; and
   an electrolyte disposed between the cathode and anode.

2. The wet electrolytic capacitor of claim 1, wherein the carbonaceous particles contain activated carbon.

3. The wet electrolytic capacitor of claim 1, wherein the carbonaceous particles have a specific surface area of at least about 200 square meters per gram.

4. The wet electrolytic capacitor of claim 1, wherein the carbonaceous particles have a specific surface area of at least about 1500 square meters per gram.

5. The wet electrolytic capacitor of claim 1, wherein the carbonaceous particles have a median size of from about 5 to about 20 micrometers.

6. The wet electrolytic capacitor of claim 1, wherein the carbonaceous particles are porous.

7. The wet electrolytic capacitor of claim 1, wherein the inorganic particles have a resistivity of less than about 1×10⁵ ohm-cm at about 20° C.

8. The wet electrolytic capacitor of claim 1, wherein the niobium oxide has an atomic ratio of niobium to oxygen of 1:less than 1.5.

9. The wet electrolytic capacitor of claim 1, wherein the niobium oxide is selected from the group consisting of NbO₀.₇, NbO₁.₀, NbO₁.₁, and NbO₂.

10. The wet electrolytic capacitor of claim 1, wherein the niobium oxide has an atomic ratio of niobium to oxygen of 1:0.5+0.2.

11. The wet electrolytic capacitor of claim 1, wherein the niobium oxide is NbO₂.

12. The wet electrolytic capacitor of claim 1, wherein the inorganic particles contain tantalum.

13. The wet electrolytic capacitor of claim 1, wherein the inorganic particles have a median size of less than about 20 micrometers.

14. The wet electrolytic capacitor of claim 1, wherein the inorganic particles have a median size of less than about 5 micrometers.

15. The wet electrolytic capacitor of claim 1, wherein the ratio of the median particle size of the carbonaceous particles to the median particle size of the inorganic particles is from about 1.5:1 to about 50:1.

16. The wet electrolytic capacitor of claim 1, wherein the ratio of the median particle size of the carbonaceous particles to the median particle size of the inorganic particles is from about 4:1 to about 15:1.

17. The wet electrolytic capacitor of claim 1, wherein the weight ratio of the inorganic particles to the carbonaceous particles in the coating is from about 0.5:1 to about 50:1.

18. The wet electrolytic capacitor of claim 1, wherein the coating contains a single layer.

19. The wet electrolytic capacitor of claim 1, wherein the coating contains two or more layers.

20. The wet electrolytic capacitor of claim 19, wherein one of the layers contains primarily inorganic particles and another layer contains a mixture of inorganic particles and carbonaceous particles.

21. The wet electrolytic capacitor of claim 1, wherein the carbonaceous particles are surrounded by the inorganic particles.

22. The wet electrolytic capacitor of claim 1, further comprising a plurality of metal particles overlying the substrate.

23. The wet electrolytic capacitor of claim 1, wherein the substrate comprises a metal selected from the group consisting of tantalum, niobium, aluminum, nickel, hafnium, titanium, copper, silver, and combinations thereof.

24. The wet electrolytic capacitor of claim 1, wherein the electrolyte is an aqueous solution containing an acid.

25. The wet electrolytic capacitor of claim 1, wherein the anode comprises tantalum or niobium.

26. The wet electrolytic capacitor of claim 25, wherein the anode comprises niobium oxide.

27. The wet electrolytic capacitor of claim 1, wherein the capacitor has an ESR of less than about 200 milliohms at a frequency of 120 Hertz.

28. The wet electrolytic capacitor of claim 1, wherein the ratio of the cathode capacitance to the anode capacitance is at least about 50.

29. The wet electrolytic capacitor of claim 1, wherein the ratio of the cathode capacitance to the anode capacitance is at least about 100.

30. A method for forming a wet electrolytic capacitor, the method comprising:
    applying a coating formulation to a substrate of a cathode;
    sintering the coating formulation to form a cathode coating, the cathode coating comprising carbonaceous particles and inorganic particles, wherein the inorganic particles contain a niobium oxide having an atomic ratio of niobium to oxygen of 1:less than 2.5; and
    disposing an electrolyte between the cathode and an anode.

31. The method of claim 30, wherein the niobium oxide has an atomic ratio of niobium to oxygen of 1:0.5+0.2.

32. The method of claim 30, wherein the niobium oxide is $NbO_2$.

33. The method of claim 30, wherein the inorganic particles contain tantalum.

34. The method of claim 30, wherein the coating formulation has a solids content of from about 20% to about 80% by weight.

35. The method of claim 30, wherein the metal substrate is dipped into the coating formulation.

36. The method of claim 30, wherein the coating formulation is sintered at a temperature of from about 500° C. to about 2400° C.

37. The method of claim 30, wherein the coating formulation is sintered at a temperature of from about 900° C. to about 1200° C.

38. The method of claim 30, wherein the coating formulation is sintered at a pressure of less than about 200 millitorr.

39. The method of claim 30, wherein the coating formulation is sintered at a pressure of less than about 50 millitorr.

40. The method of claim 30, further comprising pre-coating the substrate with a plurality of metal particles prior to application of the coating formulation.

* * * * *